United States Patent [19]
Faitel et al.

[11] Patent Number: 5,485,912
[45] Date of Patent: Jan. 23, 1996

[54] LATCHING TRANSPORT SYSTEM

[75] Inventors: William M. Faitel, Oxford; Victor G. Schoenek, Macomb, both of Mich.

[73] Assignee: Western Atlas, Inc., Hebron, Ky.

[21] Appl. No.: 303,471

[22] Filed: Sep. 9, 1994

[51] Int. Cl.$^6$ .................................................. B65G 37/00
[52] U.S. Cl. .................... 198/803.01; 104/162; 104/167; 198/743
[58] Field of Search ................................ 198/465.1, 743, 198/744, 746, 803.01; 104/162, 167

[56] References Cited

U.S. PATENT DOCUMENTS

| | | | |
|---|---|---|---|
| 2,861,676 | 11/1958 | Rasmussen et al. | 198/744 |
| 2,900,922 | 8/1959 | Edmonds | 104/162 |
| 2,948,235 | 8/1960 | Stamler et al. | 104/162 |
| 2,961,973 | 11/1960 | Bozman | 104/162 |
| 3,267,875 | 8/1966 | Chabassier et al. | 104/162 |
| 4,615,274 | 10/1986 | Hoehn | 104/167 |
| 4,633,784 | 1/1987 | Hoehn et al. | 104/167 |

*Primary Examiner*—Joseph E. Valenza
*Attorney, Agent, or Firm*—Barnes, Kisselle, Raisch, Choate, Whittemore & Hulbert

[57] ABSTRACT

Apparatus for transporting a carrier for welding equipment or the like along a predetermined path comprises a latching mechanism capable of releasably latching onto the carrier. The latching mechanism has a pair of latch arms mounted on a latch housing. The latch arms have adjacent ends which are adapted to engage forwardly and rearwardly facing abutment surfaces on the carrier when the latch arms are extended. The latch arms diverge from their adjacent ends in directions away from one another and at their opposite ends have slidable pivotal connections with the latch housing. Linkage interconnects the latch arms so that they move in unison. A drag link is provided to extend the arms into latching engagement with the abutment surfaces on the carrier, and to retract the arms.

10 Claims, 7 Drawing Sheets

5,485,912

LATCHING TRANSPORT SYSTEM

FIELD OF INVENTION

This invention relates to latching mechanism and more particularly to mechanism for latching onto and moving a carrier for transporting welding equipment or the like along a predetermined path and then releasing the carrier when it arrives at a predetermined location where certain operations are to be performed.

BACKGROUND OF THE INVENTION

In the welding of various components such as auto body parts, welding equipment is transported to a welding station on a carrier. The carrier is clamped at the welding station while certain welding operations are carried out. The carrier is then moved out of the welding station so that other operations may be performed. The carrier is moved by a suitable power device. What is needed is an improved releasable latching mechanism for latching the carrier to the power device.

SUMMARY OF THE INVENTION

In accordance with this invention, the mechanism for transporting a carrier to a desired location along a predetermined path includes a latching mechanism for releasably latching onto the carrier. Preferably, the latching mechanism comprises a pair of clamp arms which are engageable with forwardly and rearwardly facing abutment surfaces on the carrier. The clamp arms are movable from extended positions in which they engage the abutment surfaces to cause the carrier to move with the latching mechanism, to retracted positions in which the clamp arms are withdrawn from the abutment surfaces.

Preferably, a drag link is provided for shifting the clamp arms between the extended or clamping position and the release position. In a preferred construction, the drag link is connected to one of the clamp arms to extend or retract it, and linkage between the two arms causes them to move in unison so that they clamp or unclamp simultaneously.

Preferably, the clamp arms move into and out of clamping engagement with the carrier with a sliding or rolling motion over the front and rear abutment surfaces of the carrier.

One object of this invention is to provide a latching mechanism having the foregoing features.

Another object is to provide a latching mechanism which is composed of a relatively few simple parts, is rugged and durable in use, and is capable of being readily and inexpensively manufactured and assembled.

BRIEF DESCRIPTION OF THE DRAWINGS

These and other objects, features and advantages of the invention will become more apparent as the following description proceeds, especially when considered with the accompanying drawings:

FIG. 14 is a fragmentary sectional view taken on the line 14—14 in FIG. 4.

DETAILED DESCRIPTION

Figure 1:
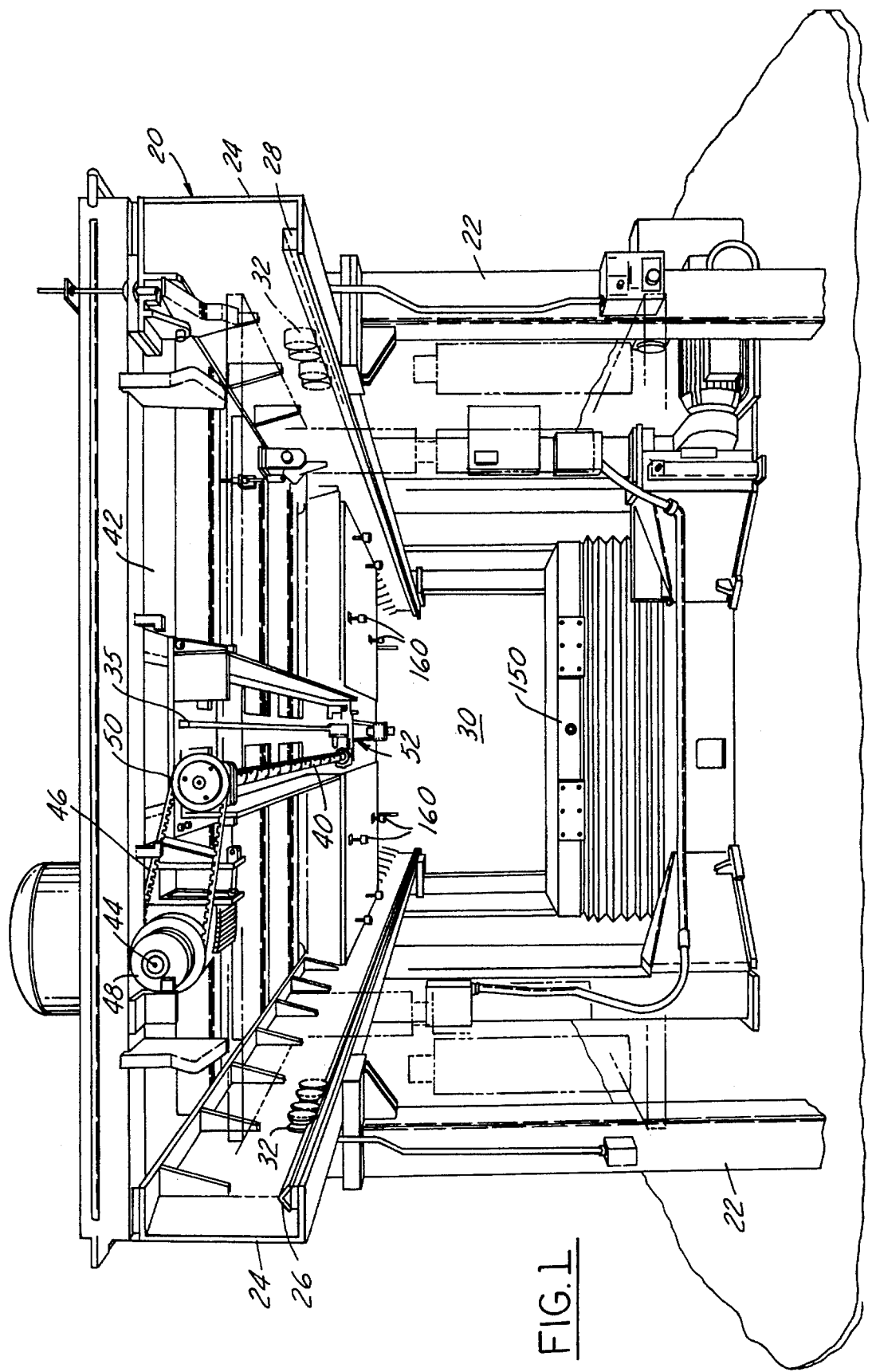
FIG. 1 is a front perspective view of apparatus constructed in accordance with the invention, but with the welding equipment carrier removed except for the rollers of the carrier which are seen engaging the roller track.
Figure 2:
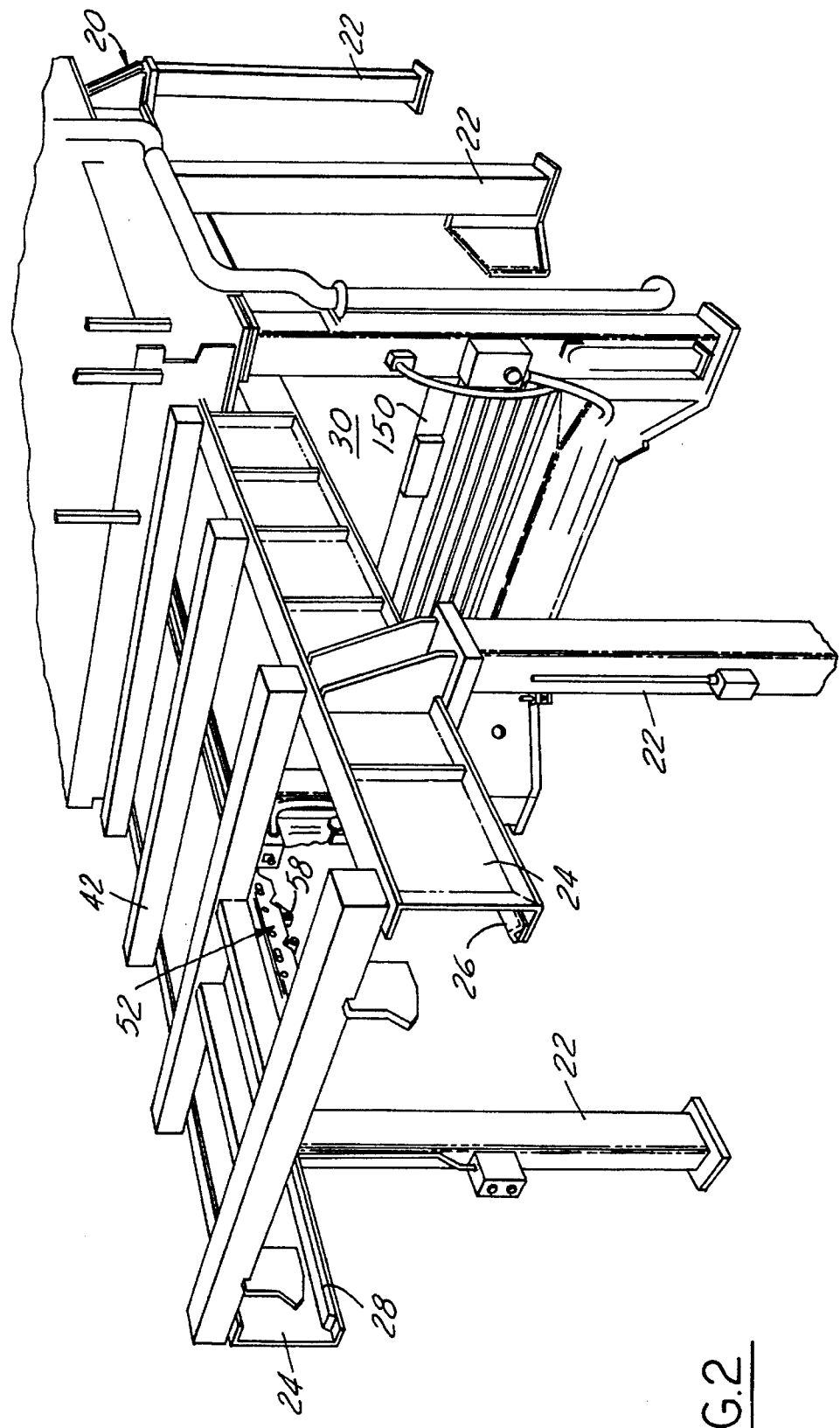
FIG. 2 is a perspective view of the apparatus in FIG. 1 as it appears from a different angle.

Referring now more particularly to the drawings, a frame 20 has two rows of upright stanchions 22 supporting two laterally spaced apart horizontal beams 24. Rails 26 and 28 are mounted on the lower inturned flanges of the respective beams 24. The rails 26 and 28 are generally horizontal and parallel to one another and extend in a forward and rearward direction along a predetermined path through a welding station 30. Rails 26 and 28 provide tracks for the rollers 32 of a carrier 34.

The carrier 34 has a generally horizontal top plate 36. Rollers 32 are suitably mounted on the opposite sides of top plate 36 and run on rails 26 and 28. The carrier has a generally horizontal bottom support plate 37 suspended from the top plate by telescoping columns 38. The bottom support plate 37 serves as a support for the bottom welding fixture. The upper welding fixture is suspended from the top plate 36.

The carrier 34 is moved along rails 26 and 28 to and from the welding press or station 30 by a latching mechanism which is supported by a guide rail 35 which is parallel to the rails 26 and 28. The latching mechanism is moved by a drive which includes an elongated lead screw 40 supported for rotation on superstructure 42 supported by the beams 24. The screw 40 extends parallel to the rails 26 and 28 through the welding station 30, and is rotated by a power unit comprising a motor 44, a drive belt 46 trained over a sheave 48 on the output shaft of the motor and a sheave 50 on the end of the screw.

Latching mechanism 52 threadingly engages the screw 40 so that when the screw is rotated, the latching mechanism is moved to the welding station where a welding operation is performed, after which the carrier can be moved away from the welding station.

Figure 3:
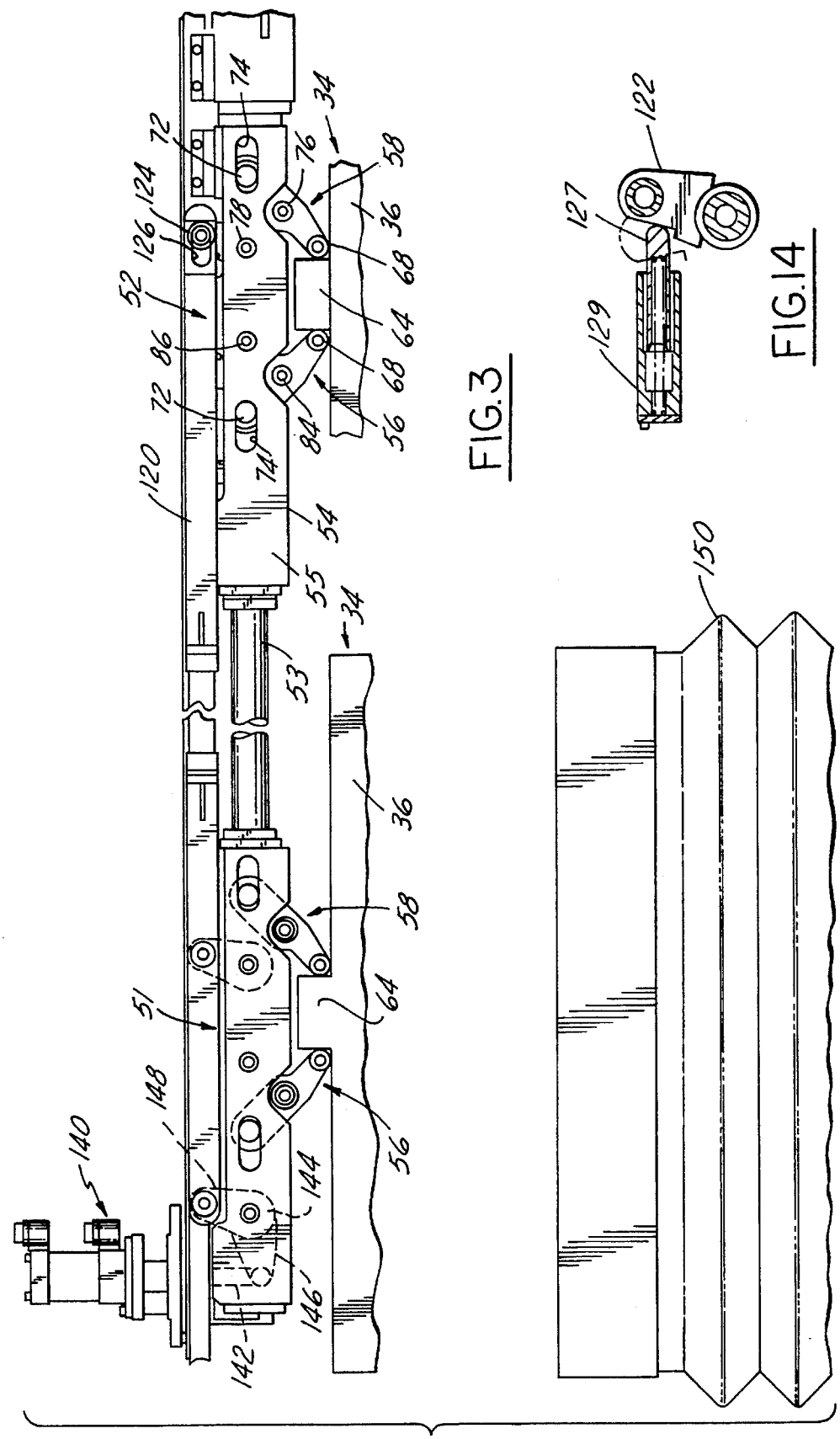
FIG. 3 is a fragmentary side elevational view showing the latching mechanism of this invention and the elevator for raising the equipment at the welding station.
Figure 4:
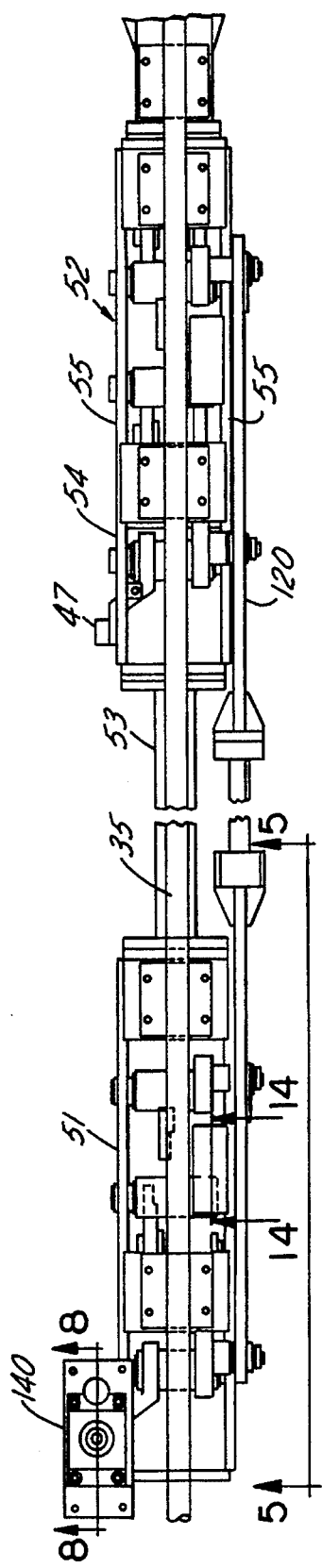
FIG. 4 is a fragmentary top plan view showing the apparatus of FIG. 3.
Figure 8:
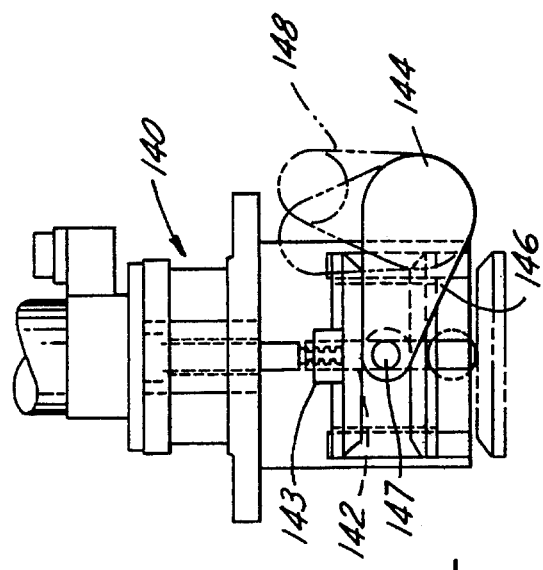
FIG. 8 is a sectional view taken on the lines 8—8 in FIG. 4.
Figure 7:
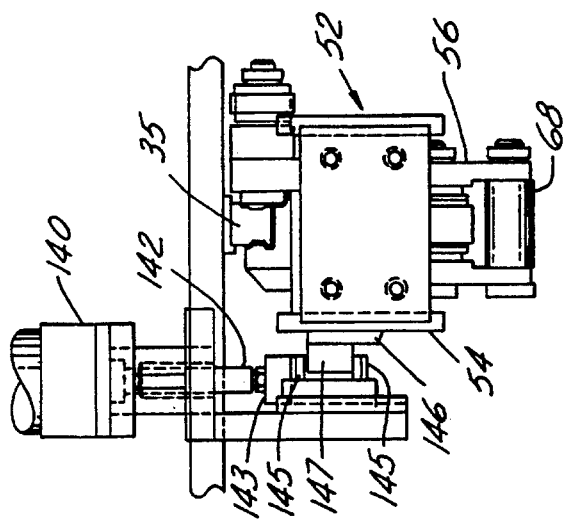
FIG. 7 is a view taken on the line 7—7 in FIG. 5.

A second latching mechanism 51, like latching mechanism 52, is shown in FIGS. 3 and 4 as being connected to mechanism 52 by a rod 53 for movement therewith. The second latching mechanism may be used where carriers are transported in tandem.

The latching mechanism 52 comprises a housing 54 having laterally spaced side plates 55 disposed in vertical planes extending in the direction of the path of carrier movement. Elongated latch arms 56 and 58 are mounted on the housing. Latch arms 56 and 58 are disposed in vertical planes parallel to the direction of carrier movement and diverge from their lower ends upwardly and in forward and rearward directions away from one another. When projected from the housing, the latch arms are adapted to grip therebetween the front and rear surfaces 60 and 62 of projection 64 on the upper horizontal surface 65 of the top plate 36 of the carrier. The front and rear vertical surfaces are preferably disposed in vertical planes perpendicular to the path of carrier movement.

Each latch arm 56,58 comprises a pair of identical elongated links 66 arranged in laterally spaced side-by-side relation between the side plates 55 of the latch housing. A transverse pin 68 interconnects the lower ends of the side links 66. A transverse pin 70 interconnects the upper ends of the side links 66. Pin 70 has extensions 72 which are slidably received in horizontally elongated slots 74 in the side plates 55.

A transverse pin 76 is pivotally connected to the links 66 of latch arm 58 intermediate their ends. A transverse pin 78 extends between and is pivotally connected to the side plates 55 of the latch housing. A link 80 has one end secured to pin 78 and the other end secured to pin 76. When the pin 78 is rotated clockwise, the latch arm 58 is moved to the FIG. 6 position in which its pin 68 is adapted to engage the rear abutment surface 62 on the top plate of the carrier. When the pin 78 is rotated counterclockwise, the latch arm 58 is moved to the FIG. 5 position, disengaging and releasing the rear abutment surface 62.

A transverse pin 84 is pivotally connected to the links 66 of the other latch arm 56 intermediate their ends. A transverse pin 86 extends between and is pivotally connected to the side plates 55 of the latch housing. Pin 86 is spaced horizontally from pin 78. A link 88 has one end secured to pin 86 and the other end secured to pin 84. When the pin 86 is rotated counterclockwise, the latch arm 56 is moved to the FIG. 6 position, in which its pin 68 is adapted to engage the front abutment surface 60 on the top plate of the carrier. When the pin 86 is rotated clockwise, the latch arm 56 is moved to the FIG. 5 position, disengaging and releasing the front abutment surface 60. When the latch arms 56 and 58 move between the FIG. 5 and FIG. 6 positions, the pins 68 on the lower ends thereof move vertically along straight parallel lines.

The latch arms 56,58 are interconnected by linkage 90 which insures that the latch arms move simultaneously and in unison with one another. Linkage 90 comprises a link 100 having one end secured to the pin 86 for rotation therewith. The other end of link 100 has a generally U-shaped yoke 102 providing a space between the arms 104 thereof. The pin 78 has an arm 106 secured thereto at one end. The other end of arm 106 has a roller 110 engaged in the space between the arms 104 of the yoke 102 on link 100. When the transverse pin 78 is rotated in one direction or the other, the interconnecting linkage 90 will insure that the other transverse pin 86 is simultaneously rotated by a like amount but in the opposite direction.

The pin 78 is rotated in one direction or the other by an elongated horizontal drag link 120 which preferably extends parallel to the direction of carrier movement and is mounted on the latching mechanisms for longitudinal sliding movement. A link 122 secured to pivot pin 78 at one end has a roller 124 on the opposite end engaged in a horizontally elongated slot 126 in the drag link. Longitudinal movement of the drag link 120 will cause a clockwise or counterclockwise rotation of pin 78, depending on the direction of link movement.

The drag link is moved in opposite directions by a power unit 140 which is mounted in fixed position. The power unit may be of various different constructions but in the present instance comprises an air cylinder having a vertical actuator rod 142. A generally C-shaped coupler 143 on the lower end of the actuator rod has vertically spaced horizontal flanges 145. A bell crank 144 pivotally mounted on each latching mechanism has one arm 146 provided with a roller 147 adapted to be slidably received between the flanges 145 of the coupler 143. The bell crank 144 has another arm 148 pivoted to the drag link. The drag link is shifted longitudinally in one direction or the other by extension or retraction of the actuator rod. Both latching mechanisms are provided with bell cranks 144 so that either one may be operated by the air cylinder. The rollers 147 associated with the bell cranks can enter and leave the space between the flanges 145 of the coupler 143 because the ends of the coupler are open. A single power unit 140 is mounted in the crown and is used to directly actuate latching mechanism 51 or 52. This eliminates the need for traveling services (air, electricity, hydraulic, etc.).

Figure 5:
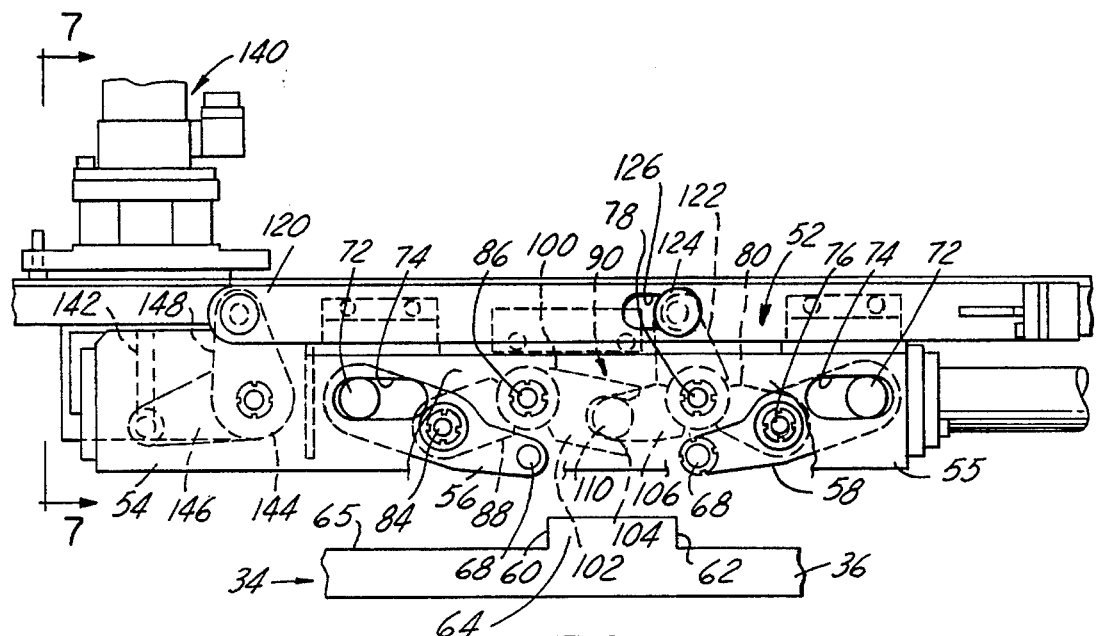
FIG. 5 is a sectional view taken on the line 5—5 in FIG. 4.
Figure 6:
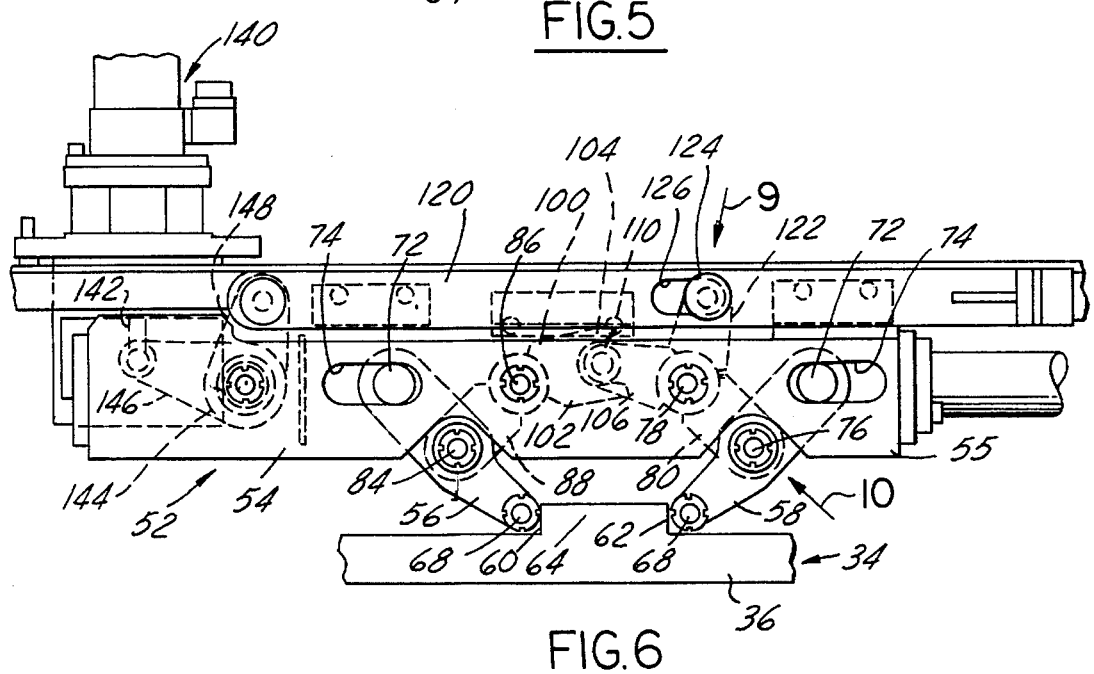
FIG. 6 is a view similar to FIG. 5 but showing the parts in a different position.
Figure 9:
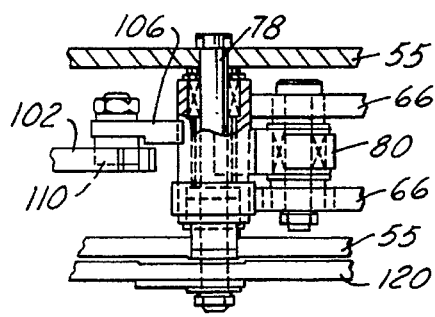
FIG. 9 is a view looking in the direction of the arrow 9 in FIG. 6.
Figure 10:
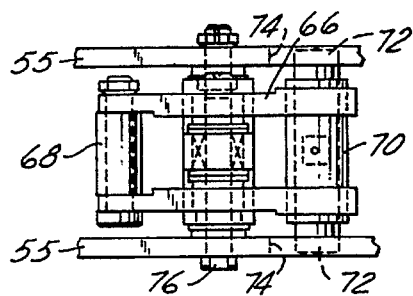
FIG. 10 is a view looking in the direction of the arrow 10 in FIG. 6.

The latch arms 56 and 58 of each latching mechanism are biased to the engaged position of FIG. 6 either by their weight, that is by gravity, or by a spring-pressed plunger 127 slidably supported in a housing 129 (FIG. 14) and engaging the link 122. This keeps the roller 124 at the right end of the slot 126 in the drag link (See FIG. 6). The latch arms may be moved to the disengaged position of FIG. 5 by the drag link 120.

At times when the latch arms of one latch mechanism 51 or 52 are in the locked or engaged position on opposite sides of the projection 64 on the top plate 36 of a carrier, it may be desired to move the second latch mechanism into a locking position with respect to the projection 64 of a second carrier. This can be done by moving the second carrier so that one of the latch arms of the second latching mechanism will cam over the projection 64 on the second carrier, lifting both latch arms which will then drop over the latter projection and engage the opposite surfaces thereof. This is permitted by the lost motion allowed by the sliding connection of roller 124 in the elongated slot 126 and without disturbing the engagement of the latch arms of the first latching mechanism with the first carrier.

Figure 12:
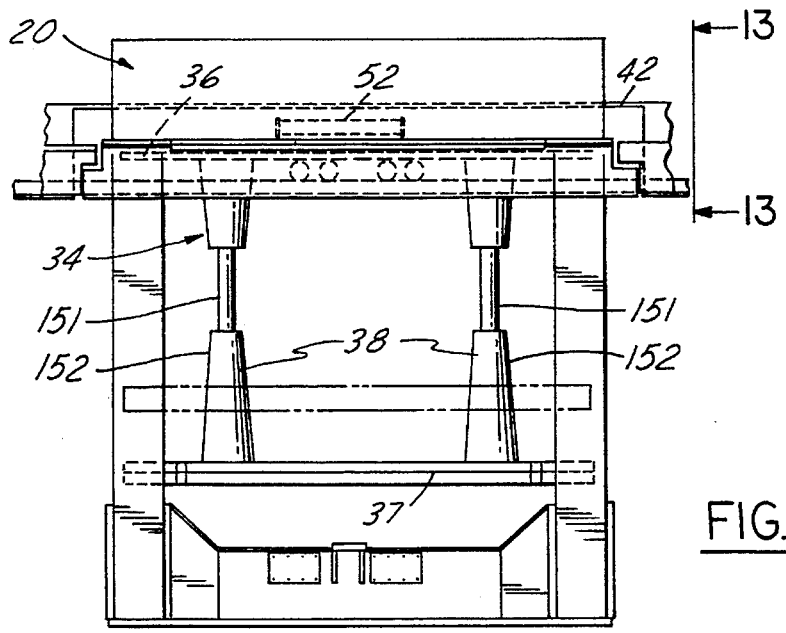
FIG. 12 is an enlargement of a portion of FIG. 11.
Figure 13:
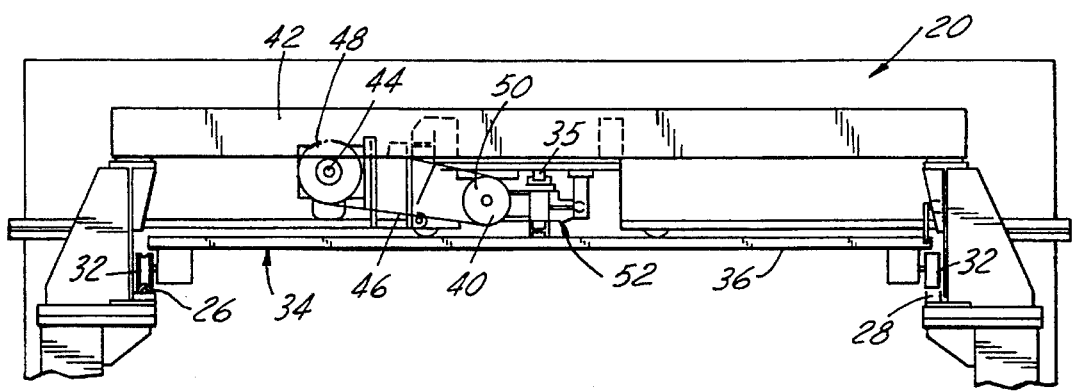
FIG. 13 is a view taken from the right in FIG. 11.
Figure 11:
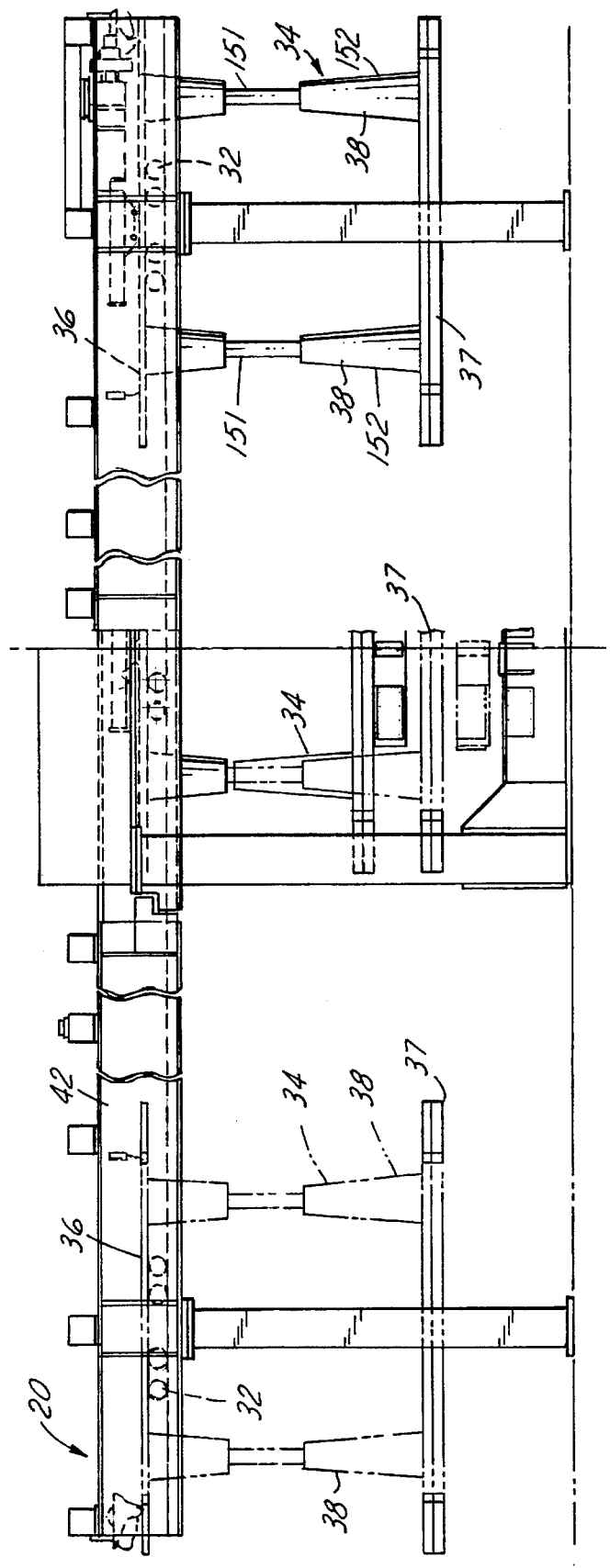
FIG. 11 is a fragmentary side elevational view of the apparatus with parts broken away.

At the welding station 30 there is a lift 150 which is adapted to raise the bottom plate 37 of the carrier. The columns 38 are normally at least partially extended to suspend the lower plate 37 in the position shown in FIGS. 11 and 12 during transport of the carrier. The telescoping column members 151 and 152 may be held in a partially extended position as by removable pins inserted in registering holes in the column members or by other suitable means. The pins are engaged to hold the welding fixtures closed for transport. When the carrier is at the welding station and the lift 150 rises, the columns telescope (the pins having first been removed) and the bottom plate is raised as also illustrated in these figures. The raising of the bottom plate brings the welding fixtures together in order to carry out the welding operation.

In use, and with the latching mechanism positioned over the top plate 36 of carrier 34 and latch arms 56,58 retracted as in FIG. 5, the drag link 120 is longitudinally shifted in one direction to extend the latch arms to the FIG. 6 position. The linkage 90 is such that the latch arms move simultaneously and in unison. The pins 68 of the latch arms move downwardly along substantially vertical paths into engagement with the abutment surfaces 60 and 62 of projection 64 and with the upper surface 65 of the top plate 36.

The pins 68 move with a sliding or rolling motion over the abutment surfaces 60 and 62 until they reach full engagement with the abutment surfaces and the upper surface of the top plate. When thus latched to the carrier 34, the latching mechanism 52 and carrier 34 are moved by operation of screw 40 to the welding station 30 where the carrier may be clamped by suitable clamps 160 in position for the welding operations to be performed. The latching mechanism may release the carrier after it is clamped, or at any time in the cycle of operation, by shifting the drag link 120 in the opposite direction to move latch arms to the FIG. 5 position.

We claim:

1. Apparatus for transporting a carrier to a desired location along a predetermined path in a forward direction, wherein the carrier has forwardly and rearwardly facing abutment surfaces, comprising:

a latching mechanism, means for moving said latching mechanism along said path in a forward direction, said latching mechanism comprising a housing, first and second latch arms carried by said housing, each latch arm having a first end and a second end, said first ends of said latch arms being engageable with the forwardly and rearwardly facing abutment surfaces, respectively, of the carrier to move the carrier along the path to said desired location, said latch arms diverging from the first ends thereof in directions away from one another, a sliding pivotal connection between the second end of each said latch arm and said housing, and means for moving said latch arms with respect to said housing from extended positions in which the first ends thereof engage the forwardly and rearwardly facing surfaces of the carrier to cause the carrier to move with said housing, to retracted positions in which said first ends are withdrawn from engagement with said forwardly and rearwardly facing surfaces to release the carrier.

2. Apparatus as defined in claim 1, wherein said sliding pivotal connection comprises elongated slots in said housing slidably receiving the second ends of said respective latch arms.

3. Apparatus as defined in claim 1, wherein said means for moving said latch arms comprises linkage connected to said latch arms intermediate the ends thereof, and means for actuating said linkage.

4. Apparatus as defined in claim 1, wherein said means for moving said latch arms comprises first and second pivot pins mounted on said housing in laterally spaced apart relation, a first link having a first end secured to said first pivot pin and a second end pivoted to said first latch arm intermediate the ends thereof, a second link having a first end secured to said second pivot pin and a second end pivoted to said second latch arm intermediate the ends thereof, and means for simultaneously turning said first and second links to move said first and second latch arms between the extended and retracted positions thereof.

5. Apparatus as defined in claim 4, wherein said means for simultaneously turning said first and second links comprises an elongated, longitudinally shiftable drag link, an arm secured to said first pivot pin and connected to said drag link and operative to turn said first pivot pin when said drag link is shifted longitudinally, and motion transfer links secured to said respective first and second pivot pins and interconnected to cause said second pivot pin to be turned in response to turning of said first pivot pin.

6. Apparatus as defined in claim 5, wherein said drag link has an elongated slot, and said last-mentioned arm has an outer end provided with a pivot pin slidably received in the slot in said drag link.

7. Apparatus as defined in claim 6, wherein the interconnection between said motion transfer links is provided by a pin on the outer end of one of said motion transfer links slidably received in an elongated slot in the other.

8. Apparatus as defined in claim 7, wherein said sliding pivotal connection between the second end of each of said first and second latch arms comprises elongated slots in said housing slidably receiving the second ends of said respective first and second latch arms.

9. Apparatus as defined in claim 1, wherein said latch arms are biased toward their extended positions and capable of being cammed toward the retracted positions thereof by one of said abutment surfaces when said carrier is moved along said path into a position wherein said abutment surfaces are adapted to be engaged by said first ends of said arms.

10. Apparatus for transporting a carrier to a desired location along a predetermined path in a forward direction, wherein the carrier has forwardly and rearwardly facing abutment surfaces, comprising:

at least two spaced apart latching mechanisms connected together in tandem,, means for moving said latching mechanisms in tandem along said path in a forward direction, each latching mechanism comprising a housing, first and second latch arms carried by each housing, each latch arm carried by the housing of each latching mechanism having a first end, and a second end, said first ends of said latch arms of each latching mechanism being engageable with the forwardly and rearwardly facing abutment surfaces, respectively, of the carrier to move the carrier along the path to said desired location, said latch arms of each latching mechanism diverging from the first ends thereof in directions away from one another, a sliding pivotal connection between the second end of each said latch arm and said housing of each latching mechanism, means for moving said latch arms with respect to said housing of each latching mechanism from extended positions in which the first ends thereof engage the forwardly and rearwardly facing surfaces of the carrier to cause the carrier to move with said housing, to retracted positions in which said first ends are withdrawn from engagement with said forwardly and rearwardly facing surfaces to release the carrier, said means for moving said latch arms comprising an elongated, longitudinally shiftable drag link extending parallel to said path, linkage interconnecting the latch arms of each latching mechanism to said drag link including a link arm having a follower engaged in an elongated slot in said drag link so that longitudinal movement of said drag link will move the latch arms of both said latching mechanisms from extended to retracted positions, said latch arms of both latching mechanisms being biased toward their extended positions and capable of being cammed toward the retracted positions thereof by one of said abutment surfaces when said carrier is moved along said path into a position wherein said abutment surfaces are adapted to be engaged by said first ends of said arms, said elongated slots in said drag link accommodating said camming of said latch arms of either of said latching mechanism without disturbing the position of the latch arms of the other of said latching mechanisms.

* * * * *